S. D. SPRONG.
LOCK NUT.
APPLICATION FILED APR. 12, 1918.

1,311,139.

Patented July 22, 1919.

Inventor
Severn D. Sprong
By his Attorney
Park Benjamin

UNITED STATES PATENT OFFICE.

SEVERN D. SPRONG, OF BROOKLYN, NEW YORK.

LOCK-NUT.

1,311,139. Specification of Letters Patent. Patented July 22, 1919.

Application filed April 12, 1918. Serial No. 228,079.

*To all whom it may concern:*

Be it known that I, SEVERN D. SPRONG, a citizen of the United States, residing at Brooklyn, in the county of Kings and State of New York, have invented a certain new and useful Improvement in Lock-Nuts, of which the following is a specification.

The invention is a lock nut. The problem here solved is to devise a nut which shall be self-locking upon its bolt, and yet be integral—or, in other words, free from any additional and separate parts, upon the presence of which its locking depends. The mode of organization is such that when the nut is set up on its bolt and against an abutment receiving said bolt, it shall undergo such a change in form as that its threaded opening shall become constricted upon said bolt, and thus so tightly jammed thereon that it cannot work loose.

In the accompanying drawings—

Figure 1:
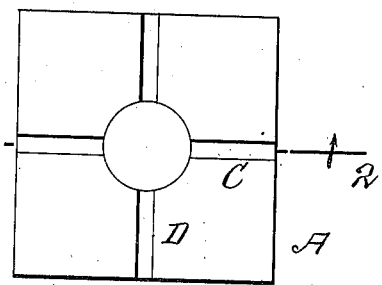
Figure 2:
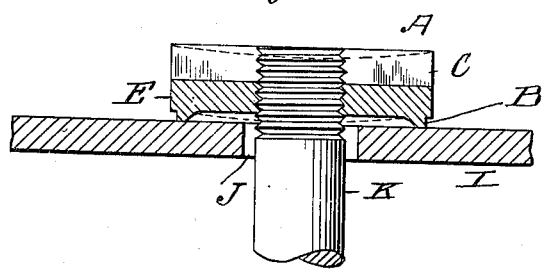
Figure 3:
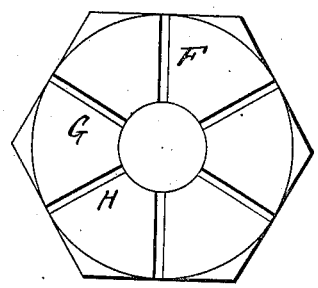

Figure 1 is a plan view of my lock nut. Fig. 2 is a section on the line 2, 2 of Fig. 1. Fig. 3 is a plan view of my lock nut, showing the channels as disposed in a nut of hexagonal shape.

Similar letters of reference indicate like parts.

A is a metal nut having the usual internally threaded bolt-receiving opening. On one face of the nut is a concentric concavity forming a circular rib B on said face. In the opposite face are formed intersecting transverse channels C, D, preferably at right angles to and bisecting the respective sides of said nut. The depth of said channels is to be such as to leave an undivided portion E of the nut between the bottoms of said channels and the circular rib B. In Fig. 2, I show the depth of said channels as about equal to the depth of the undivided portion E, but these relative dimensions may be varied, as will hereafter appear. Where the nut is of polygonal shape other than square, the number of transverse channels is to be increased, so that there shall be a channel preferably bisecting and extending between each pair of opposite sides. Thus, in the hexagonal nut, Fig. 3, there are three channels F, G, H so located. If the nut be circular, elliptical or of like curvilinear periphery, as many intersecting channels will be provided as will be sufficient to permit the constriction hereinafter set forth.

In Fig. 2, I represents a plate forming an abutment for the nut, through an opening J in which plate the bolt K, having a threaded end portion, passes. The nut being applied to said end portion and set up to force rib B against the plate, the central portion of the nut engaging the bolt threads moves onwardly—while the rib, by reason of its contact with plate I, is held stationary. The channels C, D then permit the nut to assume the concavo-convex form, substantially as represented by the dotted lines in Fig. 2, thus constricting the threaded portion of the nut upon the bolt, or, in other words, causing the nut to jam upon its bolt so tightly that it cannot work loose.

With respect to the relation between the corresponding dimensions of the channels C, D and the undivided portion E, it will be obvious from the foregoing that all that is required is that the relative depths shall be such as to allow of the constriction of the nut upon the bolt, as already described.

I claim:

A nut having on one face an outer concentric circular rib and intersecting channels in its opposite face.

In testimony whereof I have affixed my signature in presence of two witnesses.

SEVERN D. SPRONG.

Witnesses:
GERTRUDE T. PORTER,
MAY T. MCGARRY.